(12) United States Patent
Wu

(10) Patent No.: US 9,415,809 B2
(45) Date of Patent: Aug. 16, 2016

(54) CHASSIS AND AUTOMOTIVE USING SAME

(71) Applicant: HON HAI PRECISION INDUSTRY CO., LTD., New Taipei (TW)

(72) Inventor: E-In Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/791,608

(22) Filed: Jul. 6, 2015

(65) Prior Publication Data
US 2016/0207576 A1 Jul. 21, 2016

(30) Foreign Application Priority Data
Jan. 19, 2015 (TW) .................................. 104101602

(51) Int. Cl.
*B62D 25/20* (2006.01)
*B60R 19/54* (2006.01)
*B62D 21/15* (2006.01)

(52) U.S. Cl.
CPC ............ *B62D 25/2072* (2013.01); *B60R 19/54* (2013.01); *B62D 21/155* (2013.01)

(58) Field of Classification Search
CPC ...... B60R 19/54; B62D 21/15; B62D 21/155; B62D 25/20; B62D 25/2072
USPC ........... 296/187.03, 187.08, 193.07, 199, 204
See application file for complete search history.

(56) References Cited

U.S. PATENT DOCUMENTS

| 521,307 | A | 6/1894 | Crawford |
| 5,507,546 | A | 4/1996 | Holley |
| 7,192,067 | B2 * | 3/2007 | Hansen .................. B60R 19/34 293/132 |

FOREIGN PATENT DOCUMENTS

CN 1478681 A 3/2004

* cited by examiner

*Primary Examiner* — Jason S Daniels
(74) *Attorney, Agent, or Firm* — ScienBiziP, P.C.

(57) ABSTRACT

A chassis includes a chassis body and a protective device. The chassis body has a sliding rail. The sliding rail includes a main body and a bending portion at a curved extension from the main body. The bending portion is positioned adjacent to a head of the automotive. The protective device includes a protective member coupled with the bending portion. The protective member is capable of moving relative to the chassis body along the sliding rail when the protective member suffers a collision. This disclosure also supplies an automotive.

18 Claims, 7 Drawing Sheets

CHASSIS AND AUTOMOTIVE USING SAME

FIELD

The subject matter herein relates generally to a chassis and an automotive using the chassis.

BACKGROUND

A chassis for an automotive may be impacted by an external object when the automotive is driving in a road. The chassis may be damaged or deformed sometimes. Furthermore, an accident may be caused by the impact.

BRIEF DESCRIPTION OF THE DRAWINGS

Implementations of the present technology will now be described, by way of example only, with reference to the attached figures.

DETAILED DESCRIPTION

Figure 1:
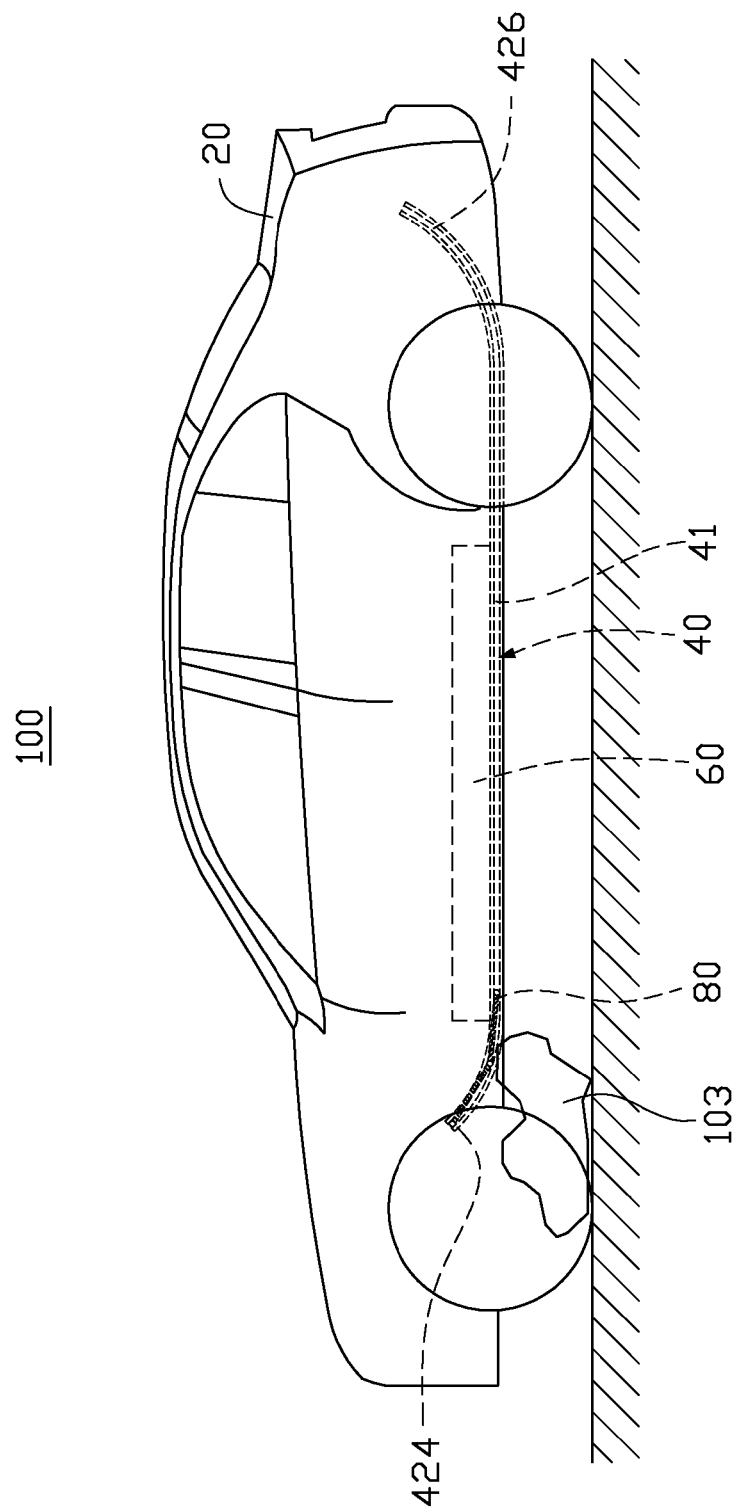
FIG. 1 is a diagrammatic view of an embodiment of a first state for an automotive including a chassis colliding with an external object.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a chassis for an automotive. A chassis can include a chassis body and a protective device. The chassis body can have a sliding rail. The sliding rail can include a main body and a bending portion at a curved extension from the main body. The bending portion can be positioned adjacent to a head of the automotive body. The protective device can include a protective member coupled with the bending portion. The protective member can be capable of moving relative to the chassis body along the sliding rail when the protective member suffers a collision. This disclosure also supplies an automotive.

The present disclosure is described in relation to an automotive. An automotive can include an automotive body and a chassis positioned on a bottom of the automotive body. The chassis can include a chassis body and a protective device. The chassis can have a sliding rail. The sliding rail can include a main body and a bending portion at a curved extension from the main body. The bending portion can be positioned adjacent to a head of the automotive body. The protective device is movably assembled with the sliding rail. The protective device can include a protective member coupled with the bending portion. The protective member can be capable of moving relative to the chassis body along the sliding rail when the protective member suffers a collision.

FIG. 1 illustrates an automotive 100 which is an electric vehicle. The automotive 100 can include an automotive body 20, a chassis 40, and a battery 60. The chassis 40 can be positioned on a bottom of the automotive body 20. The battery 60 can be positioned on the chassis 40 and received in the automotive body 20. The automotive 100 can further include other structures, such as an engine, a transmission system, but is not described herein.

Figure 2:
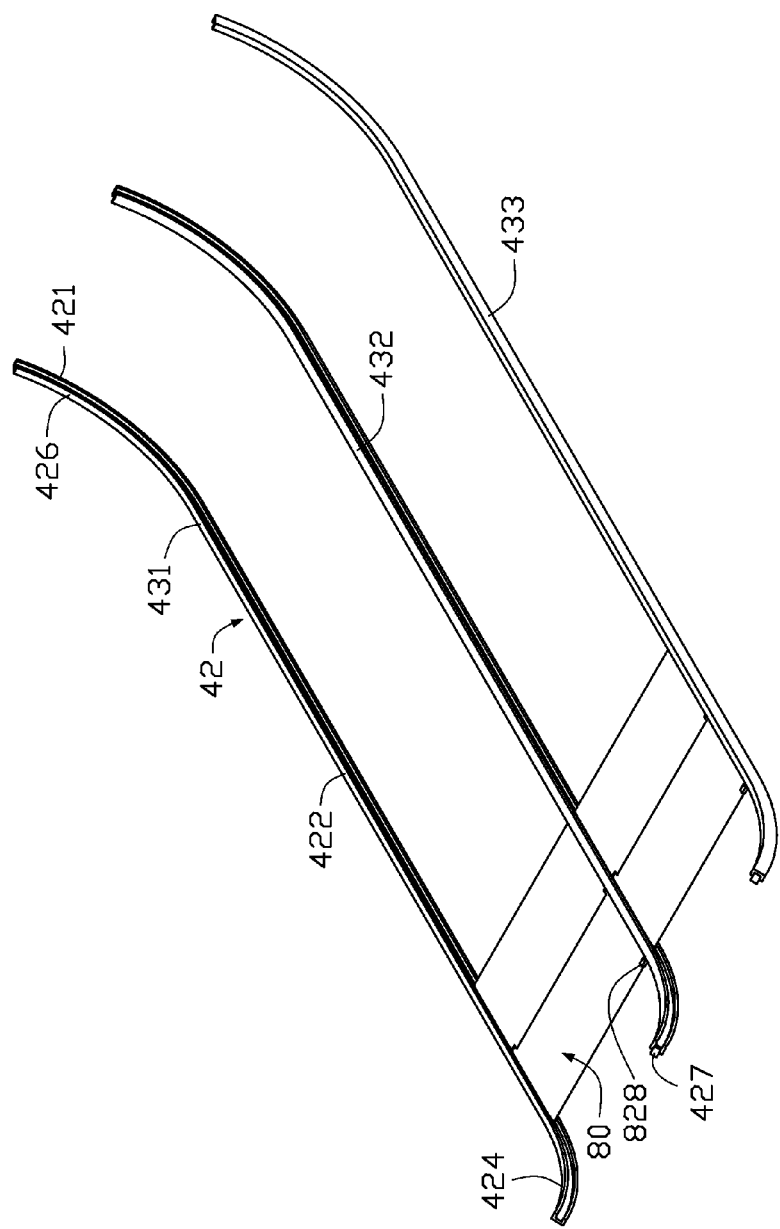
FIG. 2 illustrates an assembled, isometric view of an embodiment of protective devices of the chassis for an automotive.

The chassis 40 can include a chassis body 41 and two protective devices 80. The chassis body 20 can support a whole weight of the automotive body 20. FIG. 2 illustrates that three sliding rails 42 can be formed on a side of the chassis body 20 away from the battery 60. The three sliding rails 42 can be arranged along a width direction of the chassis body 20 and distant from each other. Each sliding rail 42 can extend along a lengthwise of the automotive 100. In the illustrated embodiment, the three sliding rails 42 are beams for the chassis body 20 to support the whole weight of the automotive body 20. The three sliding rails 42 can include a first sliding rail 431, a second sliding rail 432 and a third sliding rail 433. The second sliding rail 432 can be positioned between the first sliding rail 431 and the third sliding rail 433. One sliding groove 421 can be formed on a sidewall of the first sliding rail 431 towards the second sliding rail 432. One sliding groove 421 can be formed on a sidewall of the third sliding rail 433 towards the second sliding rail 432. Two sliding grooves 421 can be formed on opposite sidewalls of the sliding rail 432 corresponding to the sliding grooves 421 of the first sliding rail 4201 and the second sliding rail 433 respectively.

Each sliding rail 42 can include a main body 422, a first bending portion 424 and a second bending portion 426. The first bending portion 424 and the second bending portion 426 can extend from two opposite ends of the main portion 422 at a curved extension. The first bending portion 422 can be positioned adjacent to a head of the automotive 100. The second bending portion 426 can be positioned adjacent to a tail of the automotive 100. Each sliding groove 421 can extend from the corresponding first bending portion 424 to the corresponding second bending portion 426 via the main body 422. In the illustrated embodiment, the first bending portion 424 can be arc-curved coupled with the main body 422, and the second bending portion 426 can be arc-curved coupled with the main body 422. A first stop portion 427 can be formed at one end of the first bending portion 424 away from the main body 422.

Figure 3:
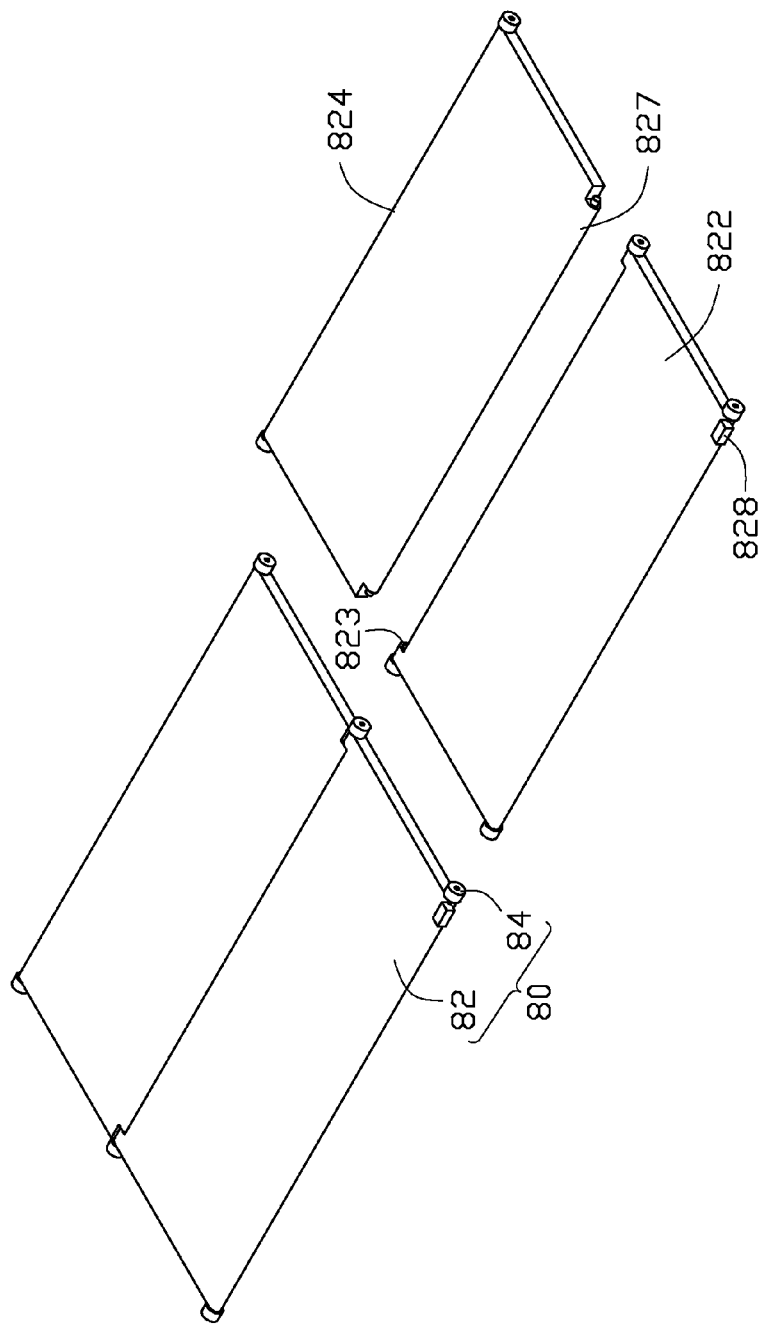
FIG. 3 illustrates an exploded view of an embodiment of the protective devices including protective members shown in FIG. 2.

One protective device 80 can be coupled with the sliding groove 421 of the first sliding rail 431 and one sliding groove 421 of the second sliding rail 432 towards the first sliding rail 431, and another protective device 80 can be coupled with the sliding groove 421 of the third sliding rail 433 and the other sliding groove 421 of the second rail 432 towards the third sliding rail 433. Referring to FIG. 3, each protective device 80 can include a protective member 82 and a plurality of rollers 84 rotatably coupled with the protective member 82. The plurality of rollers 84 can be positioned at opposite sidewalls of the protective member 82 and received in one corresponding sliding groove 421. In the illustrated embodiment, the protective member 82 can include a first protective member 822 and a second protective member 824 movably coupled with one end of the first protective member 822.

Two first connecting portions 823 can protrude from a sidewall of the first protective member 822 positioned adjacent to the second protective member 824 and spaced from each other. Two second connecting portions 827 can protrude from a sidewall of the second protective member 824 positioned adjacent to the first protective member 822 and spaced from each other, corresponding to the two first connecting portions 823. Each first connecting portion 823 can movably coupled with one corresponding second connecting portion 827 via a connecting shaft (not shown). In at least one embodiment, a connecting structure for the first protective member 822 and the second protective member 824 can be taken place by other structures, for example, an elastic member can be supplied to connect the first protective member 822 with the second protective member 824 for buffer.

Two second stop portions 828 can be formed on each protective member 82 corresponding to the first stop portion 427. Each second stop portion 828 can be locked with one first stop portion 427 when in a normal driving without collision, such that the protective member 82 can couple to the sliding rails 42 without motion. However, the second stop portion 828 can release from the first stop portion 427 when one corresponding protective device 80 suffers a huge impact. In other embodiments, the second stop portions 828 and the first stop portions 427 can be magnetic structure, or other suitable fixing structures for locking the first stop portion 427 and the second stop portion 828.

Figure 5:
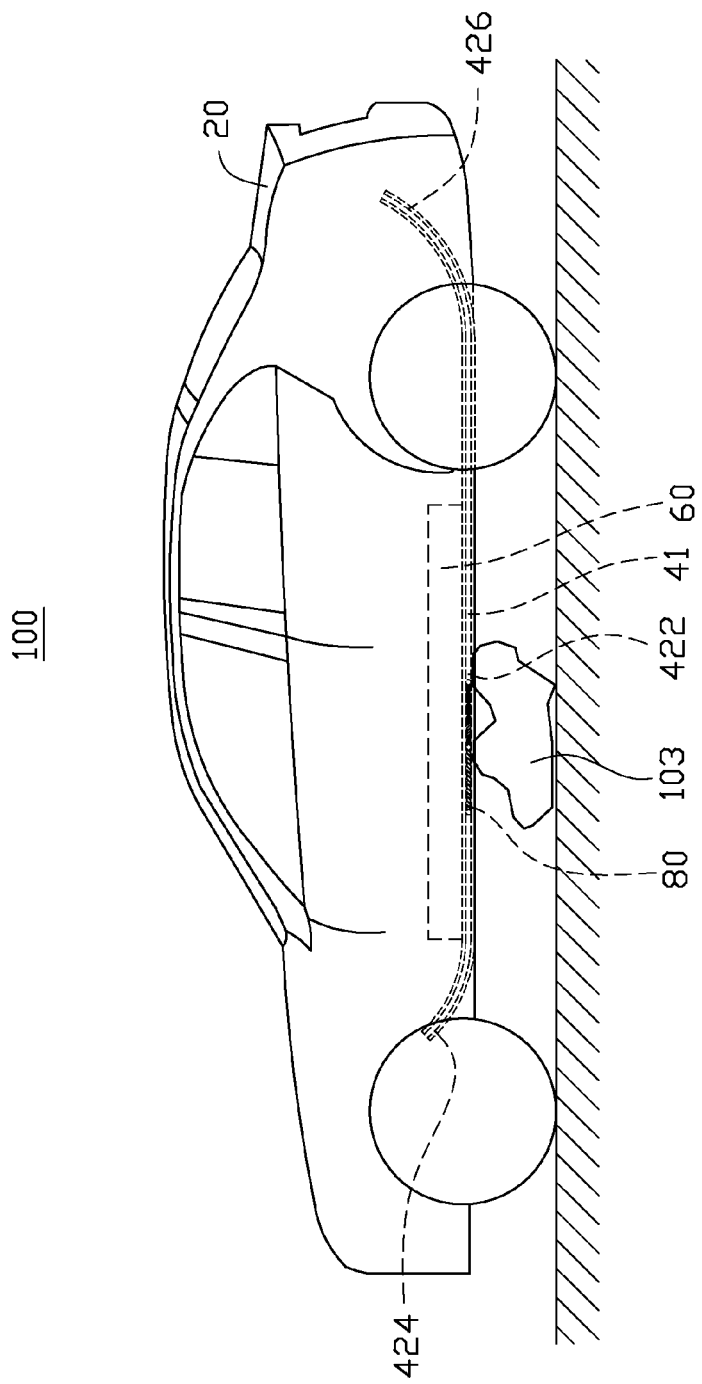
FIG. 5 is a diagrammatic view of an embodiment of a second state for the automotive colliding with the external object.
Figure 6:
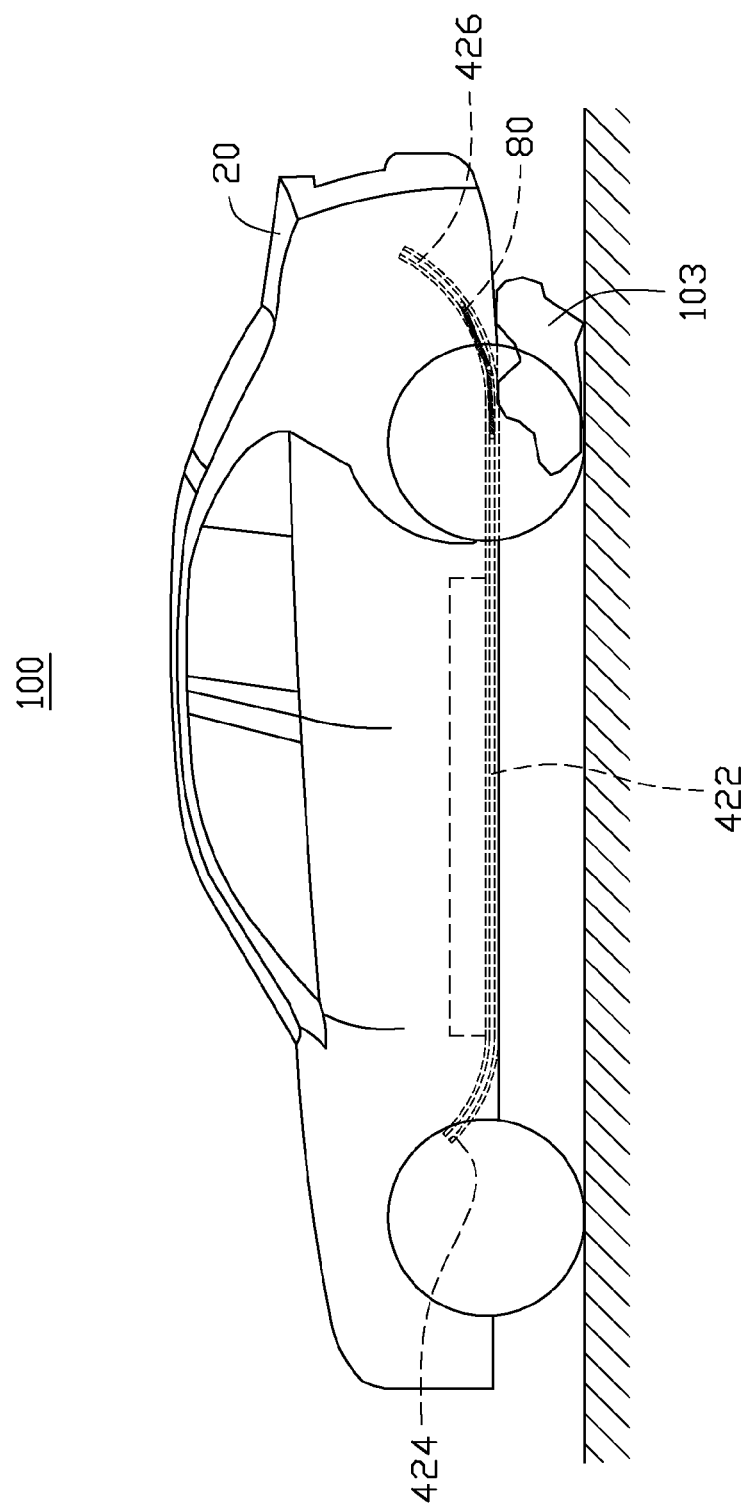
FIG. 6 is a diagrammatic view of an embodiment of a third state for the automotive colliding with the external object.
Figure 7:
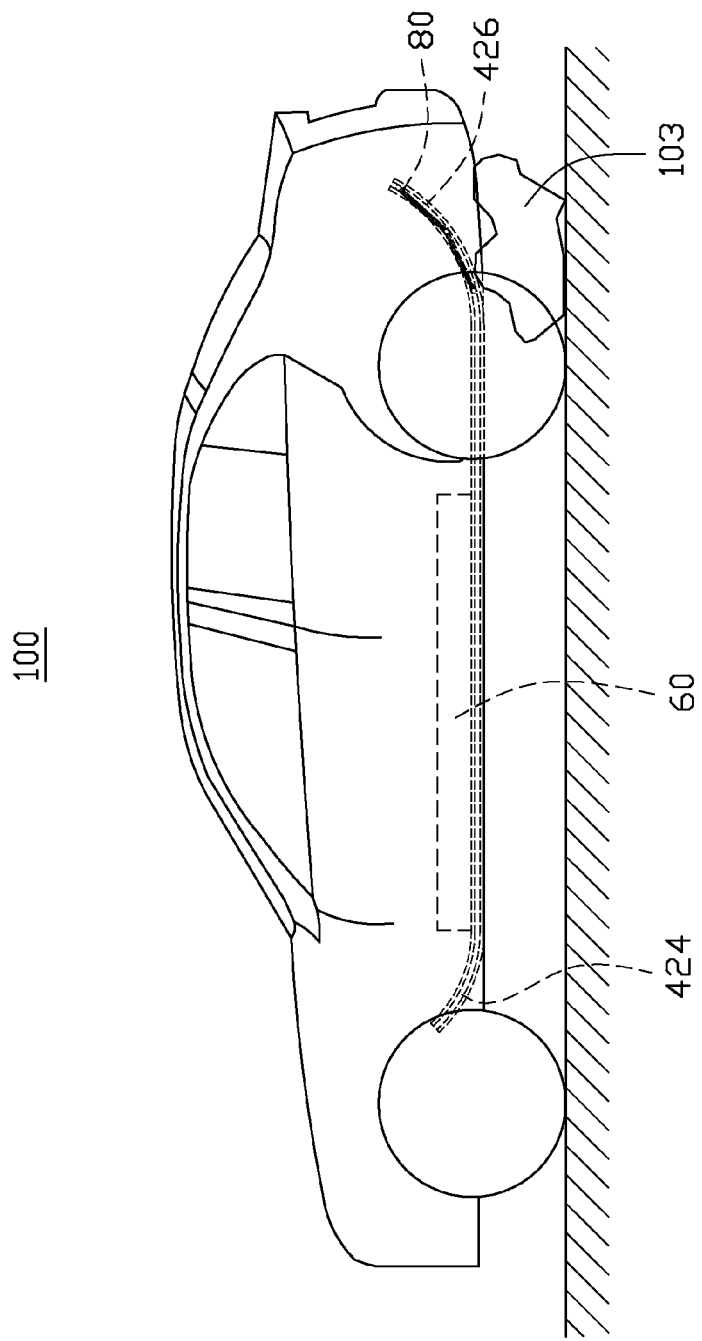
FIG. 7 is a diagrammatic view of an embodiment of a fourth state for the automotive colliding with the external object.

The rollers 84 of the first protective member 822 can be rollably received in the corresponding first bending portion 424, the second stop portion 828 can be locked with the first stop portion 427, and the protective device 80 does not move relative to the sliding rails 42 when the automotive 100 is in a normal driving. The external object 103 collides with the protective member 82 and brings the protective device 80 into a motion (as FIG. 1 shown). The protective device 80 can slide via a middle of the sliding rails 42 (as FIG. 5 shown), and arrive at the second bending portion 426 (as FIG. 6 shown). The external object 103 will be easily released from the protective device 80 when the second protective member 824 arrives at an end of the second bending portion 426 away from the main body 822 (as FIG. 7 shown), because of friction from road and greater space.

Figure 4:
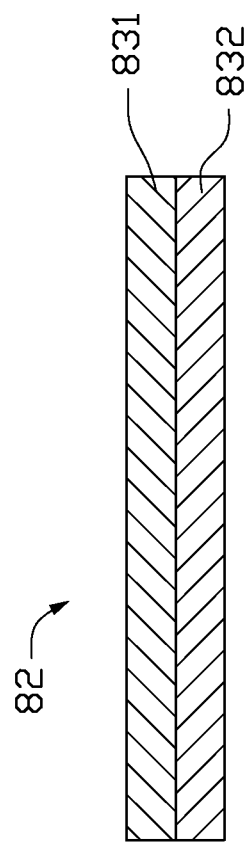
FIG. 4 illustrates a cross-sectional view of one protective member shown in FIG. 3.

The first protective member 822 and the second protective member 824 can be boards. Referring to FIG. 4, each protective member 82 can include a first buffer layer 831 and a second buffer layer 832. The first buffer layer 831 can be formed on a bottom of the second buffer layer 832 for absorbing an instant impact when the protective device 80 is in a collision with an external object 103. The first buffer layer 831 can be made of soft and elastic material, such as silicone, plastic, and/or a suitable structure including springs. The second buffer layer 832 can absorb the strength of the protective member 82, and stop the external object 103. The second buffer layer 832 can be made of stiff material, such as iron, steel or the like. In the illustrated embodiment, the first buffer layer 831 can be made of rubber, and the second buffer layer 832 can be made of steel.

In at least one embodiment, the number of the protective member 82 can be one, the protective member 82 can be just made by soft material, or elastic material, or stiff material.

In at least one embodiment, the automotive 100 can be not limited to the electric vehicle, and it can be motor-driven vehicles.

In at least one embodiment, an absorbing structure can be positioned at the end of the second bending portion 416 for absorbing energy when the protective device 80 collides with the absorbing structure.

In at least one embodiment, the number of the protective device 80 can be at least one, and the number of the sliding rail can be at least one. The rollers 84 can be omitted, a guiding rail (not shown) can be formed on a surface of the protective member 82 to slidably couple with the sliding rail 42. Or a plurality of protrusions (not shown) on a surface of the protective member 82, a plurality of rollers 84 can be rotatably coupled with the plurality of protrusions.

In at least one embodiment, the first stop portions 427 can be formed on the second bending portions 426, the second stop portion 828 can be formed on the second protective member 824, and another two protective device 80 can be positioned and locked with the first stop portions 427 for protecting the chassis 20 when reversing.

The embodiments shown and described above are only examples. Many details are often found in the art such as the other features of a chassis and an automotive using the chassis. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:
1. A chassis for an automotive, comprising:
a chassis body having a sliding rail, the sliding rail comprising a main body and a bending portion at a curved extension from the main body, the bending portion positioned adjacent to a head of the automotive body; and
a protective device movably assembled with the sliding rail,
wherein the protective device comprises a protective member coupled with the bending portion, the protective member is capable of moving relative to the chassis body along the sliding rail when the protective member suffers a collision; and
wherein the protective device further comprises a plurality of rollers rotatably coupled to the protective member, and each of the plurality of rollers is received in the sliding rail for coupling the protective member to the chassis body.

2. The chassis of claim 1, wherein the protective member comprises a first protective member and a second protective member movably coupled with the first protective member.

3. The chassis of claim 2, wherein the first protective member comprises a first connecting portion located on a sidewall of the first protective member positioned adjacent to the second protective member, and the second protective member comprises a second connecting portion located on a sidewall of the second protective member positioned adjacent to the first protective member, the first connecting portion is coupled with the second connecting portion.

4. The chassis of claim 1, wherein the sliding rail further comprises a first stop portion positioned in an end of the bending portion, the first stop portion is away from the main body, a second stop portion is formed on the protective member corresponding to the first stop portion, the first stop portion is coupled with the second stop portion, the second stop portion is configured to release from the first stop portion when the protective member is in the collision.

5. The chassis of claim 1, wherein the bending portion comprises a first bending portion and a second bending portion, the first bending portion and the second bending portion are extending from two ends of the main body, the first bending portion is positioned adjacent to the head of the automotive, and the second bending portion is positioned adjacent to a tail of the automotive.

6. The chassis of claim 1, wherein the protective member comprises a first buffer layer and a second buffer layer, the first buffer layer is formed on a bottom of the second buffer layer.

7. The chassis of claim 6, wherein the first buffer layer is made of rubber.

8. The chassis of claim 6, wherein the second buffer layer is made of steel.

9. The chassis of claim 1, wherein the sliding rail is a first siding rail, the chassis further comprises a second sliding rail, the protective device further comprises a plurality of rollers, a sliding groove is defined in a sidewall of the first sliding rail towards the second sliding rail, and another sliding groove is defined in a sidewall of the second sliding rail, and the plurality of rollers are rotatably coupled to the protective member and positioned at opposite sidewalls of the protective member, each roller is received in one corresponding one sliding groove.

10. An automotive, comprising:
an automotive body; and
a chassis positioned on a bottom of the automotive body comprising:
   a chassis body having a sliding rail, the sliding rail comprising a main body, and a bending portion at a curved extension from the main body, the bending portion positioned adjacent to a head of the automotive body; and
   a protective device movably assembled with the sliding rail,
   wherein the protective device comprises a protective member coupled with the bending portion, the protective member is capable of moving relative to the chassis body along the sliding rail when the protective member suffers a collision; and
   wherein each protective device further comprises a plurality of rollers rotatably coupled to the protective member, and each of the plurality of rollers is received in the sliding rail for coupling the protective member to the chassis body.

11. The automotive of claim 10, wherein the protective member comprises a first protective member and a second protective member movably coupled with one end of the first protective member.

12. The automotive of claim 10, wherein the first protective member comprises a first connecting portion located on a sidewall of the first protective member positioned adjacent to the second protective member, and the second protective member comprises a second connecting portion located on a sidewall of the second protective member abutting with the first protective member, the first connecting portion is coupled with the second connecting portion.

13. The automotive of claim 10, wherein the sliding rail further comprises a first stop portion positioned in an end of the bending portion, the first stop portion is away from the main body, a second stop portion is formed on the protective member corresponding to the first stop portion, the first stop portion is coupled with the second stop portion, the second stop portion is configured to release from the first stop portion when the protective member is in the collision.

14. The automotive of claim 10, wherein the bending portion comprises a first bending portion and a second bending portion, the first bending portion and the second bending portion are extending from two ends of the main body, the first bending portion is positioned adjacent to the head of the automotive, and the second bending portion is positioned adjacent to a tail of the automotive.

15. The automotive of claim 10, wherein the protective member comprises a first buffer layer and a second buffer layer, the first buffer layer is formed on a bottom of the second buffer layer.

16. The automotive of claim 15, wherein the first buffer layer is made of rubber.

17. The automotive of claim 15, wherein the second buffer layer is made of steel.

18. The automotive of claim 10, wherein the sliding rail is a first siding rail, the chassis further comprises a second sliding rail, the protective device further comprises a plurality of rollers, a sliding groove is defined in a sidewall of the first sliding rail towards the second sliding rail, and another sliding groove is defined in a sidewall of the second sliding rail, and the plurality of rollers are rotatably coupled to the protective member and positioned at opposite sidewalls of the protective member, each roller is received in one corresponding one sliding groove.

* * * * *